United States Patent [19]

Lii

[11] Patent Number: 5,291,761

[45] Date of Patent: Mar. 8, 1994

[54] MOTORCYCLE INFRARED RAYS LOCK

[76] Inventor: Jein-Hei Lii, No. 38, Chung-Te 9th Street, Tainan, Taiwan

[21] Appl. No.: 15,379

[22] Filed: Feb. 9, 1993

[51] Int. Cl.⁵ .............................................. E05B 71/00
[52] U.S. Cl. ...................................... 70/18; 70/38 C; 70/39; 70/49; 70/212; 70/226; 70/227; 70/233; 70/278; 70/DIG. 51
[58] Field of Search ............ 70/18, 30, 49, 233, 70/234, 225-227, 277, 278, 209-212, 38 R, 38 C, 39, 51, DIG. 51

[56] References Cited

U.S. PATENT DOCUMENTS

| | | | |
|---|---|---|---|
| 596,237 | 12/1897 | Damon | 70/233 |
| 3,865,245 | 2/1975 | Lieb et al. | 70/234 X |
| 4,833,442 | 5/1989 | Von Heck | 70/226 X |
| 5,181,403 | 1/1993 | Lii | 70/233 X |

FOREIGN PATENT DOCUMENTS

| | | | |
|---|---|---|---|
| 1006071 | 4/1952 | France | 70/233 |
| 463965 | 6/1951 | Italy | 70/233 |
| 8002961 | 12/1981 | Netherlands | 70/233 |

*Primary Examiner*—Lloyd A. Gall
*Attorney, Agent, or Firm*—Morton J. Rosenberg; David I. Klein

[57] ABSTRACT

A motorcycle infrared rays lock for a motorcycle include a housing, an infrared rays receiving unit and a movable block contained in the housing and an infrared rays emitting unit. The infrared rays emitting unit is deposited in a separated case to be inserted in a front opening of the housing for turning on the emitter to emit a preset data signal to a sensor to actuate a receiving IC for examining the signal and turning on a transistor to actuate an electro-magnetic switch to retract a movable block. The movable block has a tooth end engaging a rack in an end portion of a hook rod locking a free end of a chain wound around a portion of a motorcycle wheel so that the chain can be taken off the hook rod and then off the wheel.

1 Claim, 5 Drawing Sheets

MOTORCYCLE INFRARED RAYS LOCK

BACKGROUND OF THE INVENTION

Most of motorcycle locks are almost mechanical or electrical, and which are liable to be broken by illegal methods.

SUMMARY OF THE INVENTION

This invention has been devised to offer a kind of motorcycle lock to be locked without infrared rays but unlocked by infrared rays. It includes an infrared rays emitter deposited in a case, an infrared rays receiving unit contained in a housing, combined with an electromagnetic switch and a movable block to be retracted by the switch to disengage a tooth end of the movable block from a rack provided on an end portion of a hook rod combined with a chain wound around a portion of a motorcycle wheel. The rack of the hook rod protruding through the end loop of the chain wound around the wheel is inserted in the housing and engaged with a tooth end of the movable block always pushed forward by a coil spring and the hook rod can only be pushed in the housing to slide over by the tooth end but cannot be pulled out of the housing because of the shape of the tooth of the rack, and thus the chain is kept unreleasble from the wheel, i.e. locked. And to unlock it, the infrared rays emitter has to be used, inserted in a front opening of the housing to get electrified to send infrared rays to the sensor of the receiving unit to turn on the electromagnetic switch to retract the movable block, freeing the tooth end of the movable block from the rack, enabling the hook rod to be pulled out of the housing for the chain to be taken off the hook rod and then off the wheel.

BRIEF DESCRIPTION OF DRAWINGS

The invention will be better understood by reference to the accompanying drawings, wherein.

DESCRIPTION OF THE PREFERRED EMBODIMENTS

Figure 1:
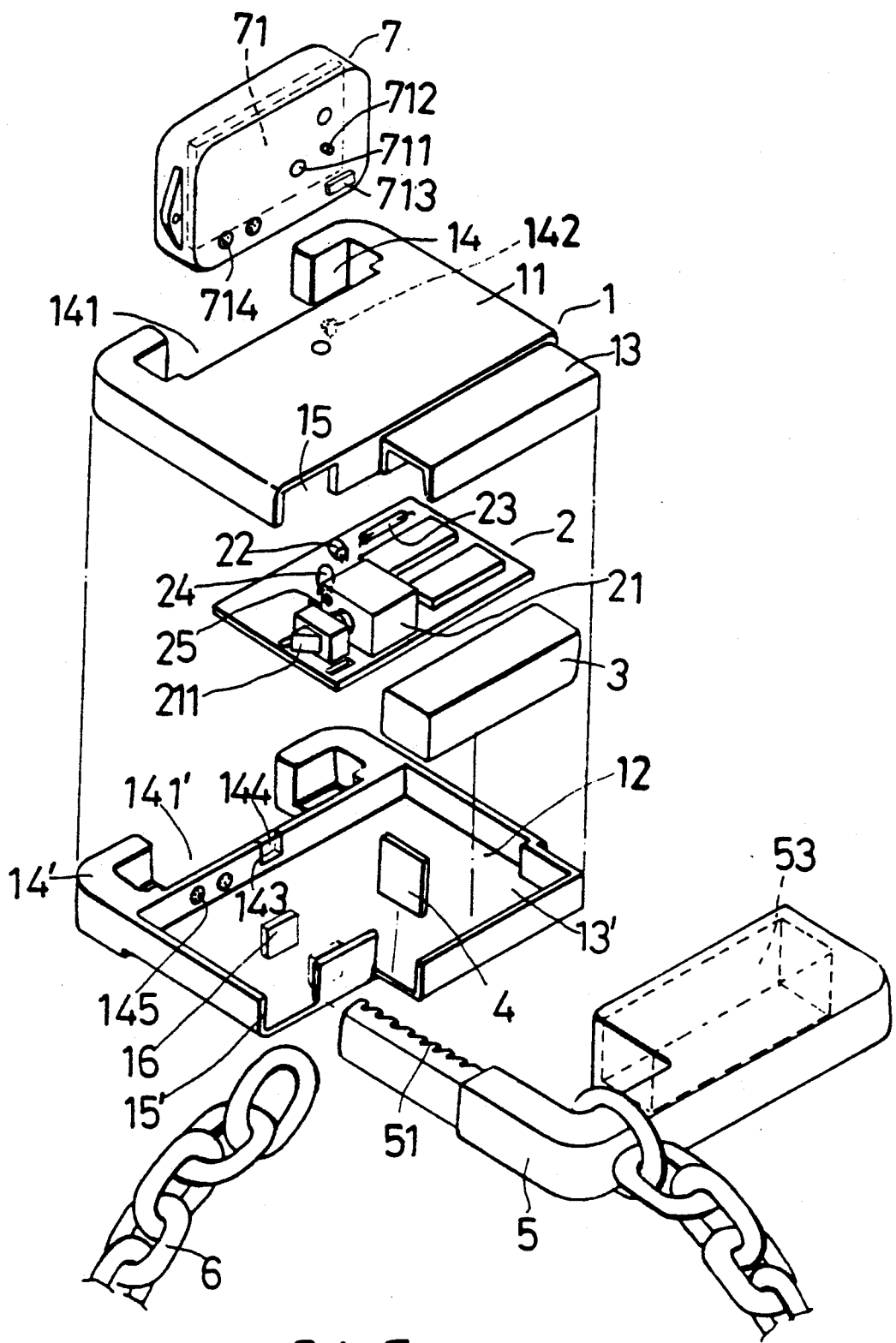
FIG. 1 is an exploded perspective view of a motorcycle infrared rays lock in the present invention.
Figure 2:
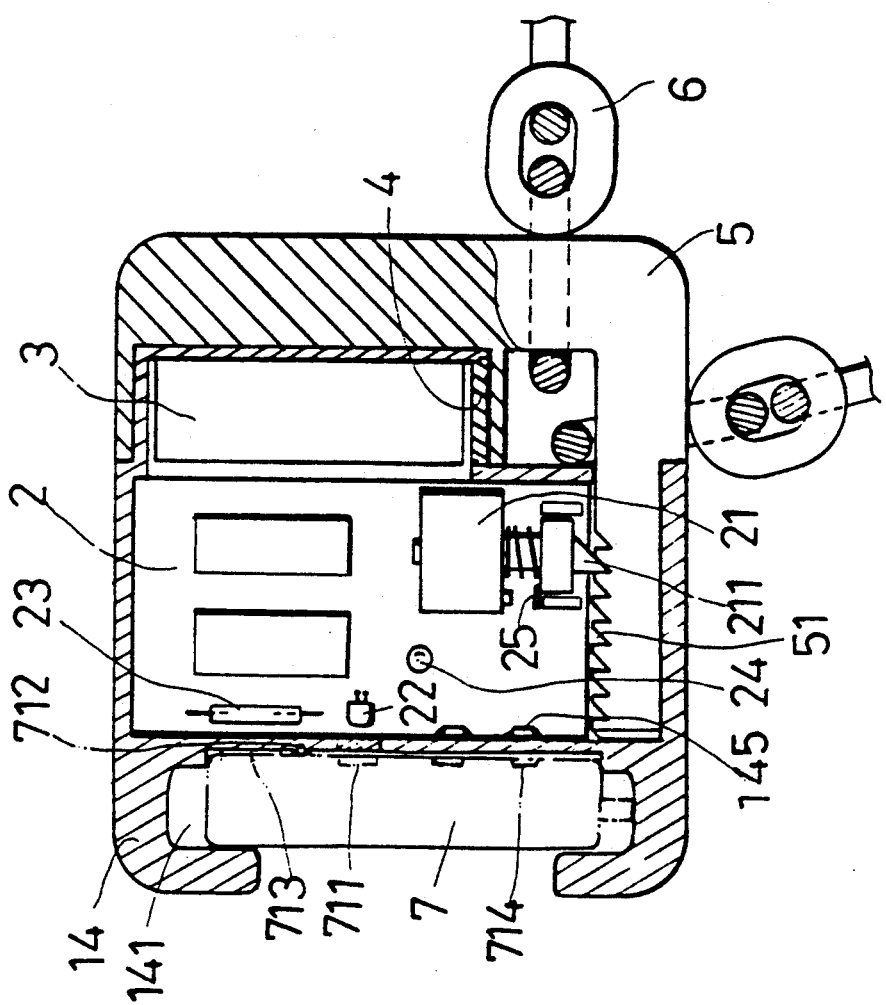
FIG. 2 is a side cross-sectional view of the motorcycle infrared rays lock in the present invention.

A motorcycle infrared rays lock, in the present invention, as qhown in FIGS. 1 and 2, includes a housing 1, an infrared rays receiving control board 2, a battery unit 3, a cap plate 4, a hook rod 5, a chain 6 and an infrared rays emitting unit 7 as main components.

The housing 1 is shaped nearly square, having an upper plate 11 and a lower plate 12 combined together. Both the upper and the lower plate 11, 12 respectively have rectangular partitioned chambers 13, 13' to correspond to each other at a rear side, bent hooks 14, 14' and openings 141, 141' inside the bent hooks 14, 14' at a front side, a projection 142 and a notch 143 with a peep glass 144 only in the front side wall of the lower plate 12, notches 15, 15' in the rear side walls, and locating blocks 16, 16 standing on an inner surface of the lower plate 12.

The infrared rays receiving control board 2 is fixed inside the upper plate 11, having a magnetic switch 21, a movable block 211 with a tooth end and a micro switch 25 combined with the magnetic switch 21 and pinched between the two locating blocks 16, 16, an infrared rays sensor 22, a spring switch 23 and an LED 24.

The battery unit 3 is a power source of the emitting unit 7 and the receiving control board 2, deposited in the chambers 13, 13' and having its positive and negative poles connected with wires having two contact points 145, 145 provided on an inner surface of a front side wall of the lower plate.

The cap plate 4 is shaped square, closing up an opening of the chamber 13, 13' for keeping the battery unit 3 therein.

The hook rod 5 is nearly L-shaped, having one end portion cut with a rack 51 and the other end portion with a hollow interior for the chamber 13, 13' to fit therein when the hook rod is pushed to the housing 1.

The chain 6 has one end unreleasably fixed on the hook rod 5 and the other end releasably protruded through by the rack portion for locking the chain 6 with the rack portion of the hook rod 5 inserted in the housing.

The infrared rays emittting unit 7 has a case containing an emiting control board 71, an infrared rays emitter 711 and a touch switch 712 mounted on the board 71, a magnet 713 and two contact points 714, 714 provided on an outer surface of the case. The magnet 713 attractingly contacts with the magnetic switch 23 of the receiving control board 2 to conduct electricity, and the projection 42 pressing the touch switch 712 to turn it on so that the infrared rays emitter 711 may be turned on to send signal to the sensor 22 of the receiving control board 2.

In assembling, as shown in FIG. 2, at first, the receiving control board 2 is mounted in the lower plate 12, permitting the movable block 211 fit in the space between the two locating plates 16, 16. Next, the battery unit 3 is placed in the chamber 13, 13' and the cap plate 4 is placed to close the opening of the chamber 13, 13' to keep the battery 3 stabilized therein. Lastly, the upper plate 11 is covered on the lower plate 12, forming the housing 1, and the sensor 22 is placed to be located just behind the peep glass 144 in the notch 143.

Figure 4:
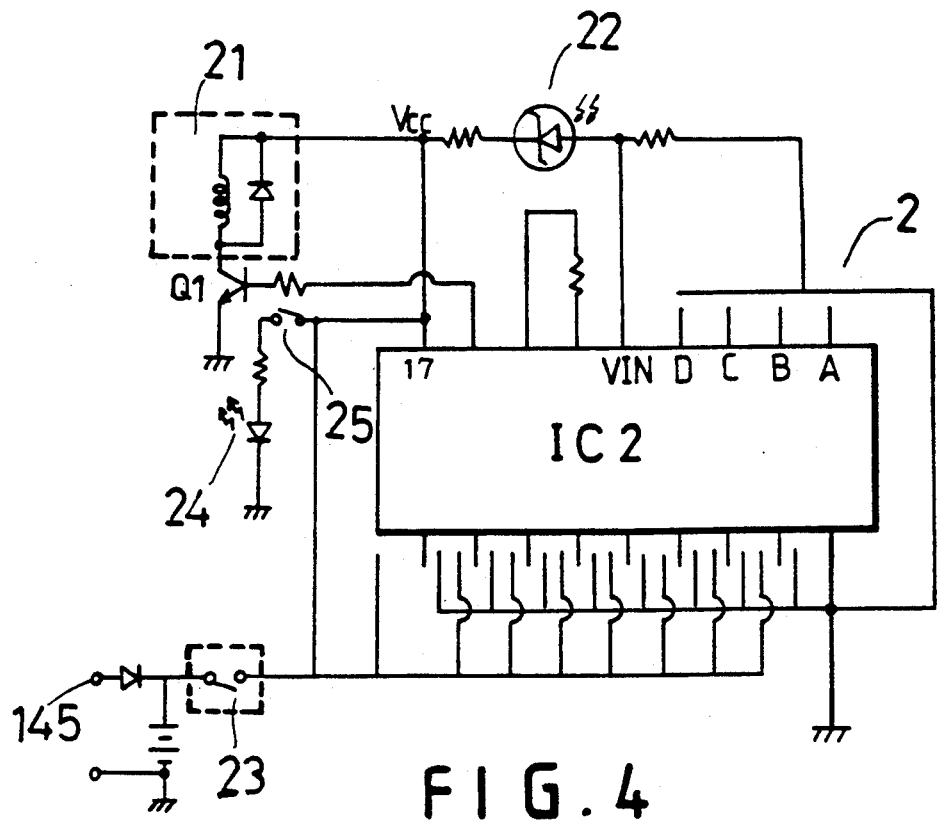
FIG. 4 is a diagram of the electronic circuit of an infrared rays receiving control board in the motorcycle infrared rays lock in the present invention.
Figure 3:
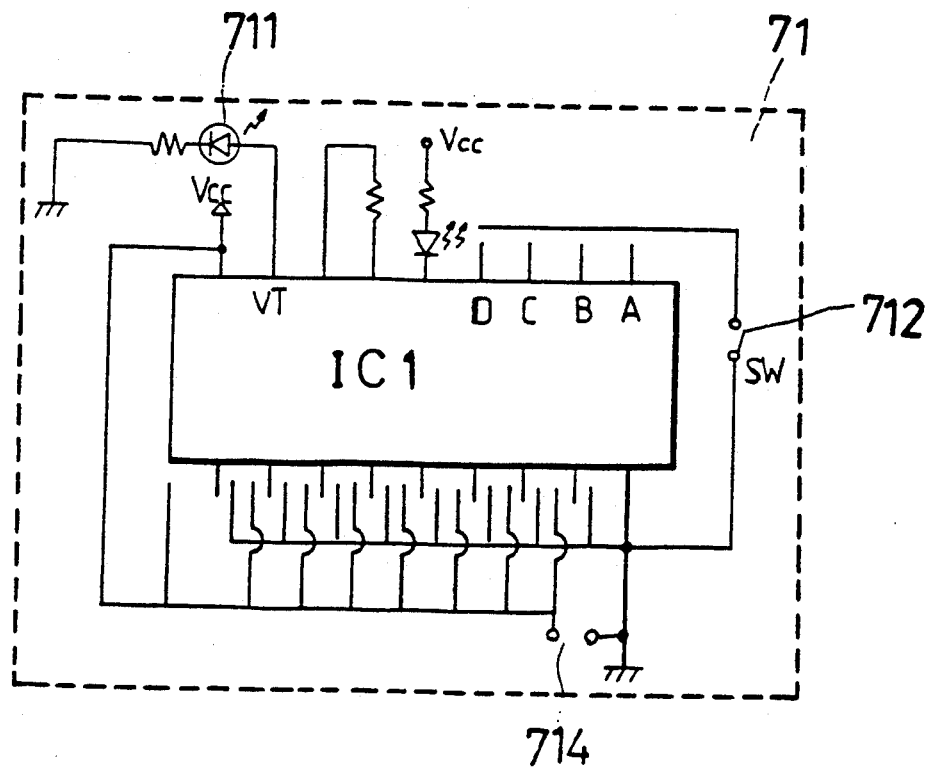
FIG. 3 is a diagram of the electronic circuit of an emitting control board in the motorcycle infrared rays lock in the present invention.

As for function and operation of this lock, as shown in FIGS. 3 and 4, if infrared rays is to be sent from the emitter 711 to the receiving control board 2 for unlocking this lock, the push switch 712 is turned on by inserting the case of the emitting unit 7 in the front opening of the housing 1, letting preset data bites A - D electrified so that the preset data signal may be sent out from a pin VT of the IC1 and through the emitting transistor 711, being received by the sensor 22 behind the peep glass 144. Then the data signal is to be sent through a pin VIN in an IC2, which then examines it whether it is correct or not, and if it is correct, turns on a transistor Q1 through a pin 17 which becomes high in potential. And subsequently, the magnetic switch 21 is electrified to function, pulling back the movable block 211 so that movable block disengages from the rack 51 of the hook rod 5.

Figure 5:
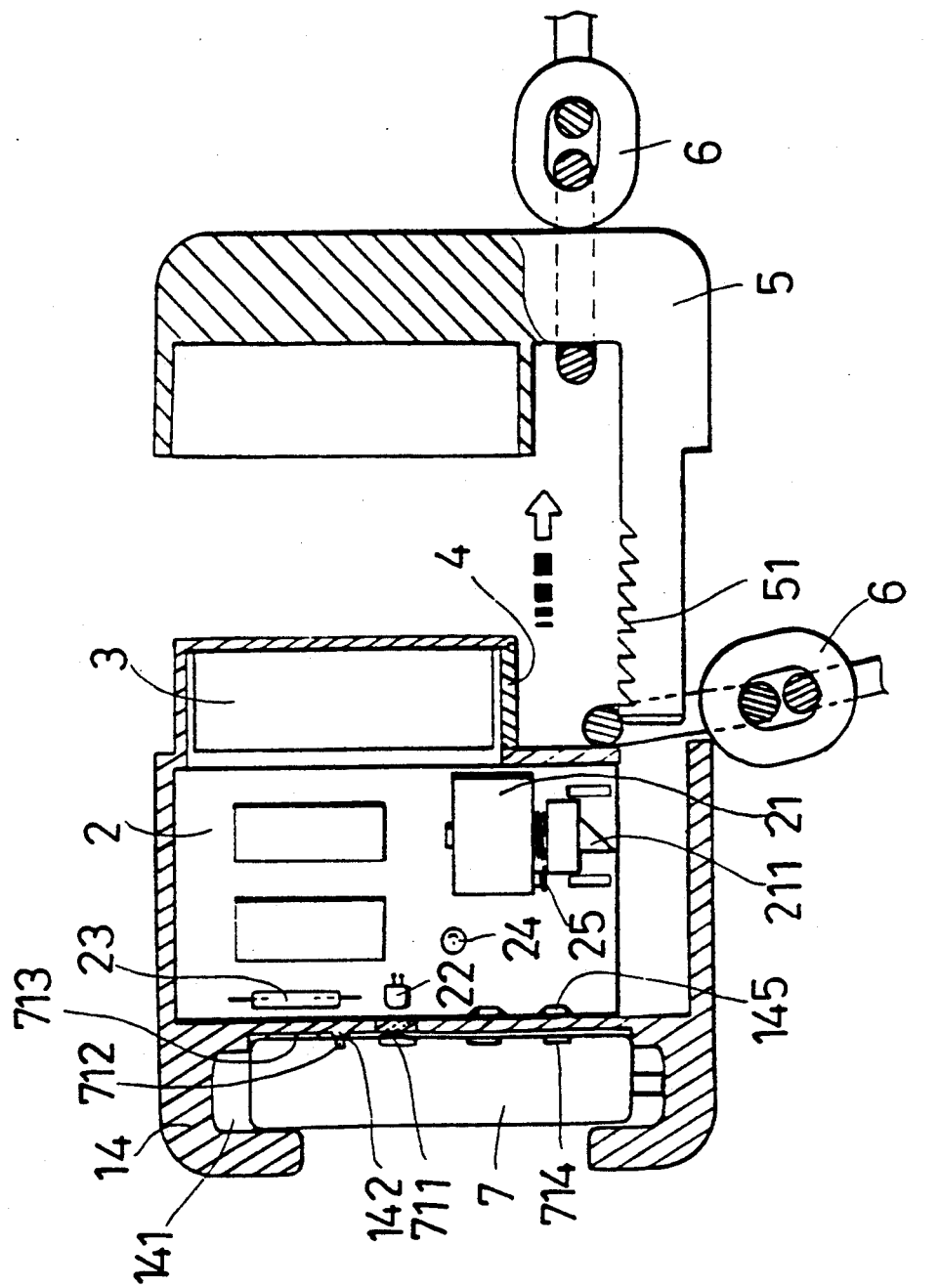
FIG. 5 is a perspective view of the motorcycle infrared rays lock in the present invention, showing how to move a chain; and, FIG. 6 is a perspective view of the motorcycle infrared rays lock of the present invention practically mounted on a wheel of a motorcycle.
Figure 6:
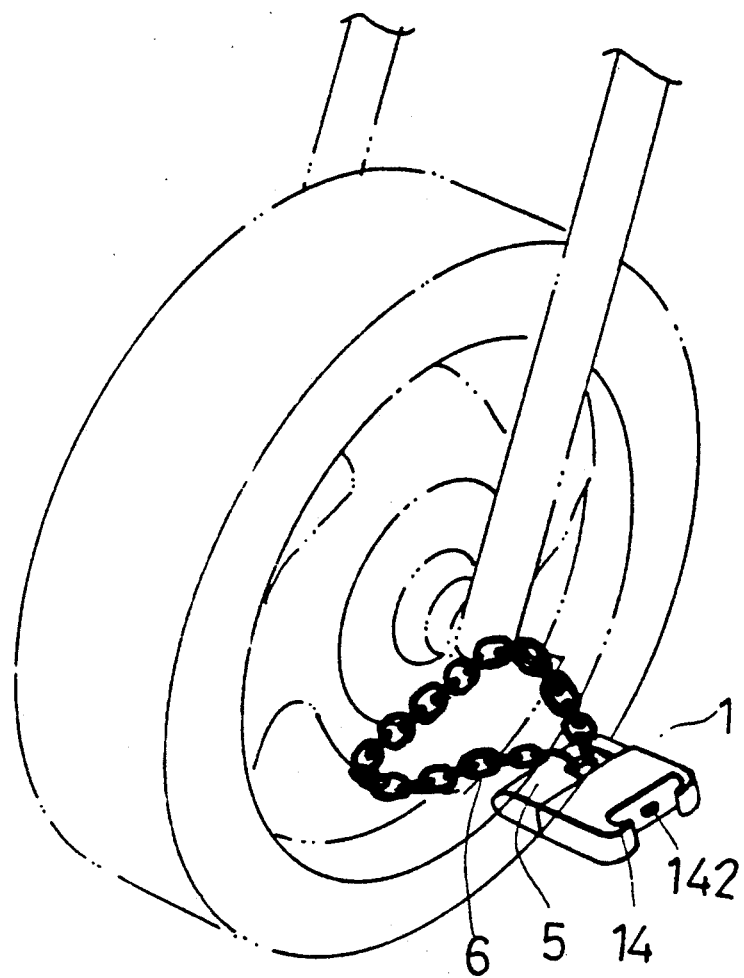

In using, as shown in FIGS. 5 and 6, in case this lock is to be used for locking a wheel of a motorcycle, the free end of the chain 6 is put around one of the wheels of a motorcycle, and then the last loop of the chain is put around the rack 51 of the hook rod 5. Then the rack 51 of the hook rod 5 is pushed in the housing 1, forcing the rack 51 into the square notches 15, 15' of the housing 1, and letting the tooth end of the movable block 211 slide over the rack and selectably engage one of the teeth of the rack 51 such that the hook rod 5 is kept immovable, i.e. locked in that position, preventing the free end of the chain 6 from taken off the rack 51 of the hook rod 5. The locating blocks 16, 16 in the lower plate 12 can keep the movable block 211 stabilized to prevent it from being broken by pulling the hook rod 5.

In case this lock is to be unlocked after this lock is mounted on a wheel of a motorcycle, with the chain 6 locked around the wheel, the emitting unit 7 is to be inserted in the opening 141, 141' of the housing 11, permitting the magnet 713 face and attract the spring switch 23 to electrify the emitting unit 7 and the receiving control board 2 and the projection 142 compress the push switch 712 to turn on the IC1 and the emitter 711, which then emits the preset data signal to the sensor 22 in the receiving IC2 on the receiving control board 2. Then the IC2 functions to let the pin 17 become high potential to turn on the transistor Q1, which then turns on the magnetic switch 21. Then the movable block 211 is retracted by the switch 21, compressing a micro switch 25, which then turns on the LED 24, informing a user that the tooth end of the movable block 5 has disengaged from rack 51 of the hook rod 5, which can then be pulled out of the housing 1, enabling the free end of the chain 6 to be taken off the hook rod 5, and then to be taken off the wheel of the motorcycle.

While the preferred embodiments of the invention have been described above, it will be recognized and understood that various modifications may be made therein and the appended claims are intended to cover all such modification which may fall within the spirit and scope of the invention.

What is claimed is:

1. A motorcycle infrared rays lock comprising:
a housing comprising an upper plate and a lower plate combined together to contain an infrared rays receiving control board and a battery unit, having a rectangular chamber for deposting said battery unit, said chamber having a square opening in a side wall for a cap plate to close it up to keep said battery unit therein stabilized, a square notch in a rear side wall for a rack portion of a hook rod to pass through in and out of said housing, two upright locating plates provided parallel on an inner side of said lower plate for guiding a movable block to move between them when said movable block is attracted by an electro-magnetic switch, said block being pushed forward by a spring when it is not attracted by said electro-magnetic switch; said infrared rays receiving control board deposited in said housing having said electro-magnetic switch for retracting said movable block, a spring switch for turning on said control board, and a sensor to receive an infrared rays signal emitted by an infrared rays emitter and to pass it to an IC for examining said signal and a transistor to be turned on by said IC in case of a correct signal to electrify said electro-magnetic switch to retract said movable block;

a hook rod having an L-shape, having a rack on an end portion to engage with a tooth end of said movable block when said rack end portion is inserted through said notch in said housing so that said hook rod can be kept immovable with said rack engaging said tooth end of the movable block to lock said hook rod, another end portion having a rectangular cavity for said battery chamber of said housing to fit therein when said hook rod is locked by said tooth end of said movable block in said housing;

a chain having one end fixed unreleasable of said hook rod and another end free, said free end being releasably inserted on said rack end portion so as to wind said chain around a portion of a wheel of a motorcycle, said free end becoming impossible to be released from said hook rod after said rack end portion of said hook rod is inserted in said housing and engaging said tooth end of the movable block, said free end capable of being taken off of said hook rod and said chain capable of being taken off of said wheel, when an infrared rays emitting unit is placed in a front opening of said housing; and, said infrared rays emitting unit deposited in a rectangular case, having said infrared rays emitter and a touch switch arranged on a board, a magnet on an outer surface of said case to attractingly contact said spring switch on said housing for conducting electricity and two contact points for wires to connect with said battery unit when said case is inserted in said front opening of said housing, said touch switch being pressed by a projection to turn on said emitter to emit said signal to be received by said sensor, said sensor placed behind a peep glass in a notch in a front side wall of said housing.

* * * * *